United States Patent [19]

Klatt

[11] Patent Number: 4,754,485
[45] Date of Patent: Jun. 28, 1988

[54] DIGITAL PROCESSOR FOR USE IN A TEXT TO SPEECH SYSTEM

[75] Inventor: Dennis H. Klatt, Brookline, Mass.

[73] Assignee: Digital Equipment Corporation, Maynard, Mass.

[21] Appl. No.: 560,221

[22] Filed: Dec. 12, 1983

[51] Int. Cl.$^4$ ............................................. G10L 5/00
[52] U.S. Cl. .................................................... 381/52
[58] Field of Search ................ 381/51, 52, 53, 36–40; 364/513, 513.5; 340/347 SH; 375/5

[56] References Cited

U.S. PATENT DOCUMENTS

| | | | |
|---|---|---|---|
| Re. 30,991 | 7/1982 | Ostrowski | 381/53 |
| 4,128,737 | 12/1978 | Dorais | 381/53 |
| 4,130,730 | 12/1978 | Ostrowski | 381/53 |
| 4,281,318 | 7/1981 | Candy et al. | 340/347 AD |
| 4,296,279 | 10/1981 | Stork | 381/51 |
| 4,301,328 | 11/1981 | Dorais | 381/51 |
| 4,301,446 | 11/1981 | Petit | 340/347 AD |
| 4,302,631 | 11/1981 | Shenoi et al. | 179/1.1 |
| 4,433,210 | 2/1984 | Ostrowski et al. | 381/53 |

OTHER PUBLICATIONS

Oppenheim, Allen V. et al, *Signals and Systems*, Englewood Cliffs, New Jersey, Prentice Hall Inc., 1983, p. 519.

Lathi, B. P. *Modern Digital and Analog Communications Systems*, New York, Holt Rinehart and Winston, 1983, pp. 63, 64, 65.

*Primary Examiner*—Emanuel S. Kemeny
*Attorney, Agent, or Firm*—Michael N. Meller

[57] ABSTRACT

In a text to speech converter, ASCII text is first transformed into phoneme parameters using for example Hunnicutt rules. Glottal waveform digital samples are generated at a rate greater than Nyquist, thereby allowing low-pass filtering and down-sampling before being combined with aspiration and fricative digitized waveforms.

12 Claims, 1 Drawing Sheet

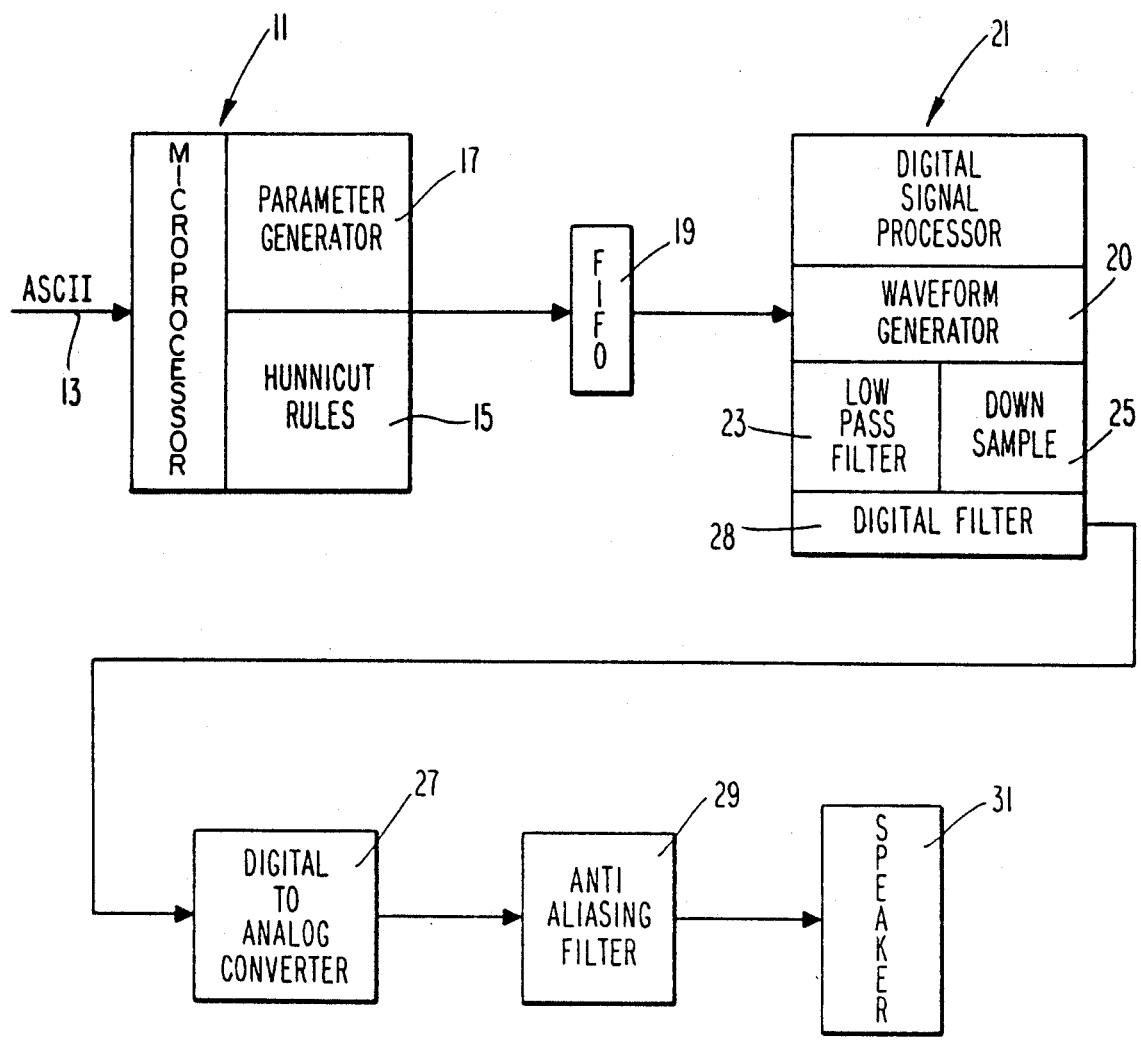

DIGITAL PROCESSOR FOR USE IN A TEXT TO SPEECH SYSTEM

BACKGROUND OF THE INVENTION

There are many text to speech devices in the prior art. As can be verified in the literature related to the prior art, it has been generally accepted that since the energy of typical human speech is distributed over a frequency spectrum of 5,000 hertz, a sampling rate of 10,000 samples per second (or twice the upper frequency value of the accepted human speech frequency spectrum) provides sufficient points, or ordinate lengths, to generate an accurate analog waveform to represent a spoken version of the text. In fact such sampling does provide an analog waveform to represent the spoken version of the text, but if the imitated speaker is a female, with a relatively high pitched voice, then the imitation speech generated by prior art devices is of poor quality.

It is well understood in the speech simulation art that the sounds which are developed by opening and closing human vocal chords, (called voiced sounds as compared to aspiration sounds and frication sounds) have a fundamental frequency in the range of 50 cps to 400 cps. The speech of a typical female, having a somewhat high pitched voice, in all probability emanates, at least in part, from vocal chords opening and closing with a frequency of somewhere between 160 cps to 400 cps. In considering the simulation of female speech, I have found that if a digitized glottal waveform, which is to be ultimately transformed into an analog signal, is sampled (for ultimate transformation into an analog signal) at the traditional rate of 10,000 samples per second and that waveform has been developed to provide a major component in an imitation of female speech, the resulting female speech is of poor quality. I have further found that if the digitized, glottal waveform is generated so as to provide enough information (temporal accuracy in specification of fundamental frequency) to provide 40,000 samples per second, such a waveform provides the basis for improving the quality of the female speech being generated. Since the digital signal processor, used to generate the digitized glottal waveform, is limited in its ability to perform digital filtering at sample rates above 10,000 samples per second, the digitized glottal waveform (having information sufficiency to provide 40,000 samples per second) must be down sampled to the rate of 10,000 samples per second. In order to preserve some of the advantages of increased information, the present system low pass filters the waveform to remove high frequency signal components and to provide a desirable averaging operation before sampling at the lower rate. Accordingly, the system provides the resulting waveform at 10,000 samples per second to be combined by software with waveforms from other sound sources. The down sampled waveform nonetheless has been the basis for very much improved quality of the generated female speech and slightly improved quality of the male speech.

SUMMARY

The present system includes a microprocessor which is adapted to receive ASCII signals from either a main computer through a UART, or the like, or from a local console. The microprocessor is programmed in accordance with the Hunnicutt rules, whereby the ASCII signals representing text expressions are transformed into phonemic sequences. The microprocessor is programmed to generate, in a preferred embodiment, some 18 parameters. The parameters, in a preferred embodiment, are 16 bits in length, which are computed every 6.4 milliseconds and represent such speech qualities as voicing source amplitude, nasal zero frequency, first formant frequency, etc. The parameter values are generated through a program which takes into account the arrangement of the phonemes and the phonemes per se. The parameter values are then transmitted to a high speed digital signal processor. In the high speed digital signal processor a set of equations are disposed in memory and a program is stored by which the parameter values control the additions and multiplications required to realize the signal transformations implied by the equations. The simulation of the equations provides a digitized glottal waveform, i.e. a model of a glottal pulse. Because the parameters are generated with factors that represent a vocal chord operation, to a high degree of temporal accuracy, and because of other factors commensurate with that consideration, the digitized glottal waveform, generated in the high speed digital signal processor, includes sufficient information to provide 40,000 samples per second. It should be understood that any sampling rate greater than 20,000 samples per second will give improved results but I have found 40,000 samples per second to provide excellent results. However, since the maximum sampling rate available for resonance filtering (within reasonable cost factor restraints) is on the order of 10,000 samples per second, the system employs two accommodating steps. First the digitized glottal waveform is subject to a programmed low pass filtering operation. In a preferred embodiment such a low pass filtering operation removes signal components which exceed a frequency of 5,000 hertz. This of course reduces the information to be retained but removes information which the system does not want to represent. In addition, I have found that the low pass filtering operation provides a certain amount of desirable averaging of available point, or ordinate, values. After the digitized glottal waveform has been low pass filtered, the signals are down sampled at a rate of 10,000 samples per second. It should be understood that if proper equipment is employed, roughly the same results can be attained at down sampling rates in the range of 6800 to 15,000 samples per second. I have found that even though the sampling rate is the same as the traditional rate, the fact that the originally developed digitized glottal waveform provided temporal accuracy in accordance with 40,000 samples per second enables the ultimate digitized glottal waveform to be combined with other sound source digitized waveforms and transformed into an improved analog waveform (that retains this temporal precision) and hence an improved speech experience.

The objects and features of the present invention will be better understood in view of the following description taken in conjunction with the drawing.

There are many text to speech devices and publications related thereto. For instance, my publications "Software For A Cascade/Parallel Format Synthesizer" published March 1980 by the Acoustical Society of America; my publication "A Text to Speech Conversion System", published in the Proceedings Office Automation Conference, March, 1981; and my publication "Review of the Science Technology of Speech Synthesis", published by National Academy Press in 1982; and the publication "Three-Tiered Software and VLSI Aid Development System to Read Text Aloud" by Bruckert, Minow and Tetschner published in April, 1983 and in particular all the publications and bibliographies referred to therein provide a broad review of the text to speech conversion art and many of the concepts with which I deal in this description.

It is well understood in the speech analysis art that sounds created by the opening and closing of human vocal chords are sounds which have a fundamental frequency in the range of 50 cps to 400 cps. Indeed the opening and closing of the vocal chords may operate at frequencies outside of that range, but in general the frequency range of 50 cps to 400 cps is considered appropriate. In the prior art speech simulation devices, a great deal of effort has been spent in developing hardware and software to build quality into the end product, namely the speech imitation. We have developed difference equations by which we can model the vocal tract; and we have developed software and hardware by which we can separately simulate different sound sources such as voicing, aspiration, and frication. However, through all of this effort little attention has been paid to the problem of the quality of simulated female speech as compared with the quality of simulated male speech and possibly the quality of all speech sources in between.

It is generally accepted that the vocal chords of a female open and close with a frequency in the range of 160 cps to 400 cps. Accordingly if we develop a digitized glottal waveform having a traditional sampling rate of 10,000 samples per second, we find that we have approximately twenty five information samples per period between vocal chord closings. Twenty five samples is insufficient to include certain features of female speech which when present provide a good quality imitation. Accordingly in my present system, I have increased the information available, which in turn includes the heretofore absent features. While I have continued with the traditional sampling rate to provide imitation speech, the imitated speech from my system shows improved quality in the case of female speech and some improvement in the imitation of the male speech. It is to those improvements that my present invention is directed.

Consider the drawing. In the drawing there is shown a microprocessor 11, into which there are fed ASCII coded alphabetical letters. In a preferred, (a system called DECtalk, produced by Digital Equipment Corporation), the text (which may be displayed on a CRT) is transformed into speech. As can be seen in the drawing, ASCII signals are transmitted over channel 13 to the microprocessor 11 and thereat the ASCII coded signals are operated on by a stored program means 15 in the microprocessor 11. In a preferred embodiment, the microprocessor 11 is a model 68000 manufactured by Motorola Corporation. The stored program means 15 includes a set of values generated in accordance with the Hunnicutt rules, the details of which are not available because such a program is licensed under an agreement of confidentiality. However, the program is available under license to the public from the Hunnicutt company. The results and the use of the results are well understood in the speech analysis art and the program is not per se basic to this invention. Other programs which transform coded text letters into phonemic expressions can be used.

The microprocessor 11 is further programmed by program 17 to use the phonemic expressions in the generation of a plurality of parameters. The parameter values are composed of 16 bits and in their generation there is taken into account the peculiarities of phonemes and the relationship of the phonemes with respect to one another. Rules for generating the parameters can be found in "Speech Synthesis by Rule", by J. N. Holmes, I. Mattingly and J. Shearme, published in Language and Speech, Vol. 7 (1964). The parameters can vary from one embodiment to another, depending upon the detail to which the published rules are followed or the altering thereof in view of empirical considerations. The generation of the parameters is not basic to the present invention; the use of the rules is well understood by those skilled in the art; and in view of the publications mentioned above, no further discussion is deemed necessary.

In a preferred embodiment the parameters are generated every 6.4 ms and transmitted from the microprocessor 11 to the FIFO memory 19. The FIFO memory 19 isolates the high speed digital signal processor 21 from the relatively slower microprocessor 11. In a preferred embodiment the FIFO memory 19 is a model 74LS224 manufactured by Texas Instruments Corp. It should be understood that other forms of memory, or isolation circuitry, could be used.

The parameter expressions are transmitted to the high speed digital signal processor 21, whereat they are used through the program means 20 to control additions and multiplications in accordance with programmed simulations of certain difference equations. In a preferred embodiment the DSP 21 is a model 32010 manufactured by Texas Instruments Corporation. It is understood in the art that certain difference equations can be simulated to provide a model of the vocal tract. Those equations and the programmed routines to compute a relationship for those equations are described in my publication "Software For A Cascade/Parallel Format Synthesizer" published in March, 1980, by the Acoustical Society of America. Since the difference equations, per se, are not fundamental to the present invention, no further discussion thereof is deemed necessary. The output of the equation simulation program is well understood and it should be recognized that it represents a digitized glottal waveform representative of some text. I have determined that the digitized glottal waveform, (under the conditions of the present discussion) should be generated to provide enough information, i.e. enough 16 bit samples to enable a sampling rate of 40,000 samples per second. I have determined that 40,000 ordinate values, or 40,000 points, can provide an analog waveform signal which includes speech features heretofore not generated in imitating human speech. The foregoing is particularly true where the voiced sounds are generated from vocal chord operations at the high end of vocal chord frequency range. Such human speech is typically identified with a female. However, since the high speed digital signal processor 21 is limited in its total computation power to sampling and digital filtering at only 10,000 samples per second (and I know of no better sampling rate by an equipment at comparable costs), the digitized glottal waveform with increased information must be sampled at a slower rate, i.e. down-sampled.

Certain steps are taken to maintain the advantages of the increased information, i.e. the increased number of plottable points, or ordinate values, while nonetheless sampling at the traditional and slower sampling rate. The system provides a second program means 23 in the digital signal processor which effects a low pass filter operation on the digitized glottal waveform. The rules and program steps necessary to software effect a low pass filter operation are found in the publication "Digital Signal Processing" by Oppenheim and Schafer, published by Prentice Hall, 1975. The technique of low pass filtering a digitized waveform is well understood in the art and is not, per se, basic to the present invention. Accordingly no further detailed discussion of the programmed low pass filter operation is deemed necessary. When the digitized glottal waveform has been subjected to the low pass filtering operation, there results a digitized glottal waveform which has had signal components whose frequencies exceed a certain threshold removed. In a preferred embodiment signal components whose frequencies exceed 5000 hertz are removed. Other thresholds could be used.

I have discovered that this low pass filtering operation performs certain averaging functions and such averaging has proven to be useful in the end product. It should also be noted that since the low pass filtering operation has removed certain signal components, the amount of information retained has been reduced but the information removed is information that the system does not want to represent. Hence the value of the information remaining in the makeup of the digitized glottal waveform is enhanced.

The system next provides a third program means 25, which includes a program to select and transmit every fourth sample, i.e, every fourth group of 16 bits. The digitized glottal waveform is combined, in the waveform generator program means 20, with other sound source waveforms. Thereafter under the guidance of a fifth program 28 the combined signal is digital resonance filtered to add peaks to the combined signal. Finally the combined digitized waveform is transmitted to the digital to analog converter 27. In a preferred embodiment the digital to analog converter is a model AD7541 manufactured by the Analog Devices Corporation.

In the digital to analog converter 27, the combined waveform is transformed into an analog waveform signal. It is well understood that in the transformation of digital signals to analog signals alias signals are always generated. The system employs an anti-aliasing filter 29 to remove alias signals, i.e. signals with frequencies in excess of 5000 hertz. The use of anti-aliasing devices is well understood and no further discussion is necessary.

Finally the combined waveform, now in an analog version, is transmitted to the speaker 31 whereat it excites the speaker to sound out the text in good quality, good imitation speech.

In a preferred embodiment the Motorola 68000 microprocessor is used because it has a 10-megahertz clock and, with 24 bit addressing, can address 16 megabytes of memory. The digital signal processor selected is a Texas Instruments TM 32010 because of its capability to execute fast mathematical computations. The memory means employed with the 68000 microprocessor, in a preferred embodiment, consists of 256k bytes of ROM and 48k bytes of RAM.

I claim:

1. In a system for transforming first digital signals representing text into an analog waveform signal, said system comprising first processing means for transforming said first digital signals into second digital signals representing a plurality of speech parameters, second processing means for transforming said second digital signals into third digital signals representing a first predetermined number of samples per second of a digitized glottal waveform, third processing means for forming fourth digital signals representing a digitized combined waveform from at least said third digital signals and fifth digital signals representing digitized sound waveforms other than said digitized glottal waveform, and means for converting said fourth digital signals into said analog waveform signal, the improvement wherein said second processing means comprises means for generating sixth digital signals representing a second predetermined number of samples per second of a digitized glottal waveform as a function of said second digital signals, means for low pass filtering said sixth digital signals to form seventh digital signals representing a digitized glottal waveform with frequencies above a predetermined threshold frequency removed, and means for down-sampling said seventh digital signals to form said third digital signals, wherein said second predetermined number of samples per second is greater than twice said predetermined threshold frequency.

2. They system as defined in claim 1, wherein said means for generating fourth digital signals comprises a first computer program, said means for low pass filtering comprises a second computer program, said means for down-sampling comprises a third computer program, and said second processing means further comprises means for storing said first, second and third computer programs.

3. The system as defined in claim 1, wherein said second predetermined number is greater than said first predetermined number by at least a factor of 2.

4. The system as defined in claim 3, wherein said first predetermined number equals about 10,000 samples per second and said second predetermined number equals at least 20,000 samples per second.

5. The system as defined in claim 4, wherein said second predetermined number equals about 40,000 samples per second, and said means for down-sampling selects and transmits every fourth sample of said seventh digital signals.

6. The system as defined in claim 1, wherein said means for low pass filtering removes components from said sixth digital signals having frequencies greater than 5,000 hertz.

7. A digital processor for use in the synthesis of speech from digitized text, comprising;
(a) means for receiving first digital signals representing a plurality of speech parameters;
(b) means for generating second digital signals representing a first predetermined number of samples per second of a first digitized glottal waveform as a function of said first digital signals;
(c) means for low pass filtering said second digital signals to form third digital signals representing a second digitized glottal waveform with frequencies above a predetermined threshold frequency removed;
(d) means for down-sampling said third digital signals to form fourth digital signals representing a second predetermined number of samples per second, of a third digitized glottal waveform; and
wherein said first predetermined number of samples per second is greater than twice said predetermined threshold frequency.

8. The digital processor as defined in claim 7, wherein said means for generating second digital signals, said means for low pass filtering, and said means for downsampling respectively comprise first, second and third stored computer programs.

9. The digital processor as defined in claim 7, wherein said first predetermined number is greater than said second predetermined number by at least a factor of 2.

10. The digital processor as defined in claim 9, wherein said first predetermined number equals at least 20,000 samples per second and said second predetermined number equals about 10,000 samples per second.

11. The digital processor as defined in claim 10, wherein said first predetermined number equals about 40,000 samples per second, and said means for downsampling selects and transmits every fourth sample of said third digital signals.

12. The digital processor as defined in claim 7, wherein said means for low pass filtering removes components from said second digital signals having frequencies greater than 5,000 hertz.

* * * * *